United States Patent Office 2,990,503
Patented June 27, 1961

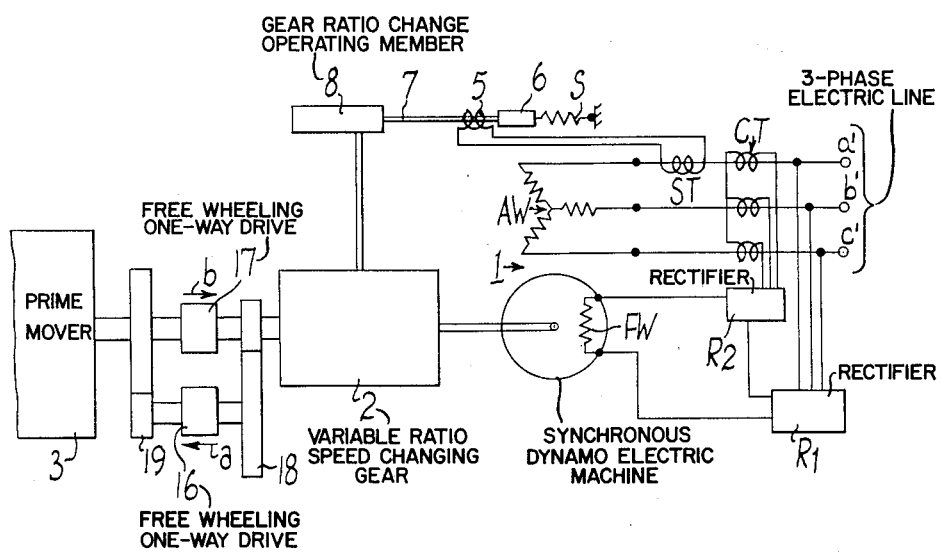

2,990,503
SPEED CONTROL OF ELECTRIC
MOTOR DRIVES
Leonard Jack Clark, Bilton, Rugby, England, assignor to
The British Thomson-Houston Company Limited, London, England, a British company
Filed May 13, 1958, Ser. No. 735,010
Claims priority, application Great Britain May 20, 1957
1 Claim. (Cl. 318—11)

This invention relates to electric motor drives including a variable ratio speed changing gear, and although not so limited it is particularly suitable to be used for starting prime movers, such as gas turbines for aircraft propulsion.

The main object of the invention is to employ in conjunction with a gear of the kind specified above an A.C. machine of the synchronous type, and to control automatically, when said machine operates as a driving motor, the ratio change in the said gear in dependence upon the torque and power of the driving motor as ascertained by the magnitude of the current drawn by the machine so as to maintain this magnitude at a predetermined level.

From a general aspect the invention resides in an electric motor drive comprising a synchronous dynamo-electric machine, a variable ratio speed changing gear arranged with one end shaft coupled to the shaft of said machine, and the other end shaft for driving a load, a first means for producing signals which change with the change of magnitude of the current flowing through said dynamo-electric machine, and a second means for controlling the said gear, said second means being controlled by the signals of said first means to maintain the said current magnitude substantially at a predetermined value.

More details will become apparent from the following description referring to the single figure of the accompanying drawing which shows diagrammatically a preferred embodiment of the invention.

Referring to the drawing a driving motor 1 comprising a dynamo-electric machine of the synchronous type is coupled through a variable speed ratio gear 2, which is preferably of a hydraulic kind constructed to provide for a zero output speed setting, to a prime mover 3, using any suitable intermediary speed reducing and step-up gear trains 18, 19 arranged to become effective by the operation of free wheel devices 16, 17 known per se to transmit power in the direction $a$ to start the engine, or in the direction $b$ if it is desired to drive the dynamo-electric machine for operation as generator. A field excitation winding FW of the machine 1 is energised by direct current supplied by two aiding components one being provided by a rectifier R1 connected to the line terminals $a1$, $b1$, $c1$, of a three phase supply of the motor 1, in this case, and the other aiding component being provided through a rectifier R2 from current transformers CT associated with the conductors carrying current from the terminals $a'$, $b'$, $c'$ to the armature windings AW of the motor 1.

Another current transformer ST is provided to produce a signal responsive to the current value supplied to the windings AW. This signal is employed for the energisation of a solenoid 5 arranged to attract a core 6 against a biasing force indicated by a spring S. The core 6 is coupled through a link 7 to a device 8 for controlling the unit 2 in such manner that its gear ratio is automatically varied to maintain substantially constant the magnitude of current drawn by the motor 1 from the alternating current supply.

Modifications are possible without departing from this invention as defined by the appended claims. In lieu of the solenoid actuating a mechanical link of the gear controlling device 8, a relay having its energising circuit connected to the transformer ST and its contacts connected in an actuating circuit controlling the operation of the device 8 could be used.

What I claim is:

A drive comprising a dynamo-electric machine, said dynamo-electric machine being of the synchronous type having a field winding and an armature, means for connecting said armature to an alternating current source of electrical power, a first rectifier means, means for connecting the input of said first rectifier means across said alternating current source of electrical power whereby a voltage responsive direct current source is provided, an aiding second rectifier means, current transformers connected to be energized responsive to current traversing said armature and for energizing said aiding second rectifier means, means connecting the output of said first and second rectifier means in additive relation and to said field winding for energizing the latter, a variable ratio speed changing gear for coupling a load to said machine, said gear having an operating member the displacement of which controls the gear ratio thereof, and a control device operable responsive to the magnitude of electric current traversing said dynamo-electric machine armature and coupled to said gear operating member so that a change in the dynamo-electric machine armature current causes a change in the ratio of said gear which tends to maintain a substantially predetermined magnitude of said armature current.

References Cited in the file of this patent
UNITED STATES PATENTS

| | | |
|---|---|---|
| 1,330,790 | Dean | Feb. 17, 1920 |
| 2,350,913 | Mercer | June 6, 1944 |
| 2,519,118 | Curtis et al. | Aug. 15, 1950 |